United States Patent [19]

Darnall et al.

[11] Patent Number: 4,992,207

[45] Date of Patent: Feb. 12, 1991

[54] COMPOSITION FOR EXTRACTION OF METAL IONS AND OXANIONS

[75] Inventors: Dennis W. Darnall; M. Dale Alexander; Michael Henzl; Benjamin Greene; Michael Hosea; Robert A. McPherson, all of Las Cruces, N. Mex.

[73] Assignee: Bio-Recovery Systems, Inc., Las Cruces, N. Mex.

[21] Appl. No.: 762,658

[22] Filed: Aug. 5, 1985

Related U.S. Application Data

[63] Continuation-in-part of Ser. No. 677,148, Dec. 3, 1984, abandoned.

[51] Int. Cl.$^5$ ............................................. B01J 13/00
[52] U.S. Cl. .................................... 252/315.6; 47/1.4; 75/722; 106/1.05; 252/315.1; 210/616; 423/27; 423/42; 423/54; 423/100; 435/176; 435/243
[58] Field of Search ...................... 435/262, 281, 176; 252/315.1, 315.6; 47/1.4; 210/616

[56] References Cited

U.S. PATENT DOCUMENTS

| | | |
|---|---|---|
| 3,521,400 | 7/1970 | Ort ............................................ 47/1.4 |
| 3,889,418 | 6/1975 | Porter et al. ........................ 47/1.4 X |
| 4,148,689 | 4/1979 | Hino et al. ....................... 435/176 X |
| 4,243,692 | 1/1981 | Scholze et al. ................. 435/176 X |
| 4,461,832 | 7/1984 | Tschang et al. ..................... 435/176 |

OTHER PUBLICATIONS

P. Adlercruetz et al., "Oxygen Supply to Immobilized Cells: 2. Studies on a Coimmobilized Algae-bacteria Preparation with in situ Oxygen Generation," *Enzyme Microb. Technol.* 4: 395–400, 1982.
P. Wikstrom et al., "Formation of —keto Acids from Amino Acids Using Immobilized Bacteria and Algae," *Biotechnology Letters* 4: 153–158, 1982.
M. Brouers et al., "Immobilization of Chloroplasts, Chloroplast Membrane Fractions and Plant Cells, and Stabilisation of the Photosynthetic Activities for the Photoproduction of Hydrogen." *Commission of European Communities Report*, 1984.
K. K. Rao et al., "Immobilization of Chloroplasts, Algae and Hydrogenases in Various Solid Supports for the Photoproduction of Hydrogen," *Biochemical Society Transactions* 10: 527–528, 1983.
P. G. Rouxhet et al., "Immobilization of Yeast Cells by Entrapment and Adhesion Using Siliceous Materials," *Enzyme Microb. Technol.* 3: 49–52, 1981.
N. Mozes et al., "Dehydrogenation of Cortisol by *Arthrobacter Simplex* Immobilized as Supported Monolayer," *Enzyme Microb. Technol.* 6: 497–502, 1984.

Primary Examiner—Richard D. Lovering
Attorney, Agent, or Firm—Skjerven, Morrill, MacPherson, Franklin & Friel

[57] ABSTRACT

The present invention relates to a method for the selective extraction of the metals gold, silver, platinum or mercury ions or colloidal gold, from an aqueous solution containing at least one of these metal ions which comprises contacting the solution, at a pH of 2 or less, with cells or cell extracts of a microorganism capable of binding these metals for a period of time and under conditions sufficient to allow binding of the metals to the cells or cell extracts. It also relates to a method of selectively recovering gold, silver, platinum or mercury ions or gold (0) from a metal-containing aqueous solution containing at least one of gold, silver, platinum or mercury ions or gold (0) which comprises contacting the solution, under metal-binding conditions, with cells or cell extracts of microorganism capable of binding gold, silver, platinum, or mercury ions or gold (0), for a period of time sufficient to allow binding of metals; adding, under eluting conditions, a sulfur containing ligand to the cells to selectively elute gold, silver, platinum or mercury ions or gold (0), and recovering an eluate.

4 Claims, 9 Drawing Sheets

COMPOSITION FOR EXTRACTION OF METAL IONS AND OXANIONS

GOVERNMENT SUPPORT

This research was funded in part by the U.S. Department of the Interior and the New Mexico Water Resources Institute, Grant Nos. 4-FG 93-000-40 and 14-08-0001-G922.

RELATED APPLICATIONS

This is a continuation-in-part of copending and commonly assigned U.S. Ser. No. 677,148, filed Dec. 3, 1984 and now abandoned.

BACKGROUND OF THE INVENTION

A great deal of public attention has recently been focused on the problem of heavy metal contamination of drinking water supplies; the ingestion of metals such as mercury, even in very small quantities, is known to cause acute and chronic illness in both humans and other animals. In response to this inherent danger, a number of states and the Federal government have enacted legislation to control further pollution of surface and ground-water supplies. Strict requirements have been imposed on industry to insure that heavy metals are removed prior to effluent discharge. The procedures required to accomplish this, such as carbon absorption, flocculation-sedimentation, and treatment with ion-exchange resins, may prove to be very costly. Thus, it would be desirable to develop a technique for removal of metals from water which is rapid, efficient, and inexpensive, and at the same time requires a low level of technology. Another direction in which this technology may be applied is for the removal of valuable metals from mine drainage.

One direction in which there has been a heavy concentration of research is the use of microorganisms for leaching metals (and other substances) from water. Bacteria have long been used for leaching a variety of metals from various sources. For example, U.S. Pat. No. 3,937,520 describes the use of anaerobic bacterial of the genera Ferrobacillus and Thiobacillus for in situ "mining" of minerals; in this case, the bacteria produce sulfuric acid which leaches the mineral from the stratum. U.S. Pat. No. 3,923,597 discloses the use of a genetically engineered Pseudomonas which binds mercury by the production of a mercury-binding protein. It is also known to utilize certain phototropic bacteria to remove silver from photographic processing effluents (U.S. Pat. No. 4,135,976).

It is also possible to extract metals by employing microorganisms other than bacteria. For example, U.S. Pat. No. 4,293,333 discloses the use of funji to remove precious metals from dilute aqueous solutions. Also known to be particularly useful are various species of blue-green algae and green algae. U.S. Pat. No. 3,725,291 describes a sorbent which utilizes plant material, including algae, to adsorb metals such as mercury, uranium, silver, platinum, palladium and gold from aqueous solutions. However, this system has at least two drawbacks: it recommends the use of pulverized algal cells; and also requires that the plant adsorbent be combined with a polymeric binder. Other methods are known which utilize whole algal cells without the necessity for combination with a binder. For example, Nakajima et al., (*Eur J. Appl. Microbiol Biotechnol* (1982) 16:88-91) teach the use of whole Streptomyces or Chlorella cells immobilized in a polyacrylamide gel for uranium extraction. Sloan et al., (*Proc. Ind. Waste Conf.* (1984), Sec. 9, Metal Works, 423-429) further describe the use of the algae Nostoc, Anabaena and Chlorella for copper, cadmium, lead and zinc extraction.

Conspicuously absent among the known uses for microorganisms in metal recovery is a technique by which a selective extraction of precious metals such as gold and silver, can be accomplished. A process which could selectively recover these metals from old mining dumps, mineral leaching operations, and industrial processes which use these metals would clearly have tremendous commercial potential. Although it has been known to use microbial systems to extract metals from waste systems, very frequently particularly desirable metals, such as gold and silver will be found in solution with other metals which are not of interest, but which will bind to the microbial cells as well as the precious metals. Therefore, what is truly needed is a method by which the microbial cells' ability to bind metals can be manipulated in such a manner that the particular metal or substance of interest will either be bound to the substantial exclusion of unwanted metals, or a method for selectively recovering the precious metals from microbial cells to which they are bound without also recovering other undesirable bound metals.

It has now been unexpectedly discovered that certain microorganisms under controlled conditions of pH and salt concentration can be used to selectively bind gold, silver or platinum, while essentially preventing the binding or causing the release of a number of competing metals. The present invention, which may employ either dead or living cells, without the necessity for using costly ion-exchange resins, provides a simple, inexpensive, low-technology method of extracting valuable metals from even dilute aqueous solutions. This method also provides a means for mercury extraction. At the same time, the present method provides a simple procedure for eluting metals other than gold, silver, mercury and platinum from microbial cells to which they are bound. It has also been found that the metals gold, silver and mercury can be selectively recovered from microbial cells to which they are bound, even if other unwanted metals are also bound to the microbial cells, regardless of the pH at which binding occurs. Also provided is a method of extracting certain oxoanions from waste waters containing them, and novel compositions useful in metal extraction.

BRIEF DESCRIPTION OF THE INVENTION

The present method provides a process for selectively extracting metal ions of gold, silver, platinum, and mercury, and gold (0), to the substantial exclusion of other metal ions, from an aqueous solution containing at least one of gold, silver, platinum or mercury, which comprises contacting the aqueous solution, at a pH of about 2 or less, with cells or cell extracts of a microorganism capable of binding these metal ions, for a period of time sufficient to allow binding of gold, silver, platinum or mercury ions to the cells or cell extracts.

The present invention also relates to a method of selectively recovering gold, silver, platinum or mercury ions or gold (0) from a metal-containing aqueous solution containing at least one of gold, silver, platinum or mercury ions or gold (0) which comprises contacting the solution, under metal-binding conditions, with cells or cell extracts of microorganism capable of binding gold, silver, platinum, or mercury ions or gold (0), for a period of time sufficient to allow binding of metals; adding, under eluting conditions, a sulfur containing ligand to the cells to selectively elute gold, silver, platinum or mercury ions or gold (0), and recovering an eluate.

The present invention further provides a method for eluting metal ions, other than gold, silver, platinum and mercury, and gold (0) bound to microbial cells or cell extracts in an aqueous solution by reducing the pH of the solution to about 2 or less, so that the binding of the metals to the cell or cell extract is reversed and the bound metals released.

Also provided are compositions of matter for use in metal extraction which comprise algae impregnated glass wool, and a silica gel-algae combination.

In a further embodiment of the present invention, it is preferred to utilize unicellular green or blue-green algae, particularly those of the genus Chlorella, although a number of different types of microorganisms may be employed.

DETAILED DESCRIPTION OF THE INVENTION

It has previously been found, as noted above, that a wide variety of microorganisms, such as Thiobacillus, Scenedesmus, Chlorella, Chlamydomonas or Oscillatoria, have the ability to bind certain metals to their cell surfaces.

An interesting aspect of this binding is the observation that each metal has a specific pH at which its binding to microbial cells will be maximized (Narberg et al., *Biotechnol. Bioeng.* 26: 239, 1984; Nakajima et al., *Eur. J. Appl. Microbial Biotechnol.* 16: 88, 1982; Shumate et al., *Biotech Bioeng. Symp. No.* 10, Wiley and Sons, 1980; Galun et al., *Water, Air and Soil Pollution* 20: 277, 1983; Greene et al., 40th *S.W. Regional Meeting ACS*, Abstract No. 3, 1984. See FIG. 7).

For metal ions such as $Cr^{+3}$ (as $Cr(H_2O)_6^{+3}$), $Co^{+2H}$, $Ni^{+2}$, $Cu^{+2}$, $Zn^{+2}$, $Cd^{+2}$, $Pb^{+2}$, $Sn^{+2}$, $U^{+6}$, $Be^{+2}$ and $Al^{+3}$, binding is at maximum levels at a pH between 5 and 7, and decreases drastically at lower pH. At a pH of about 2, none of these metals are bound at significant levels. It has now unexpectedly been discovered that in the system according to the invention the binding of gold, silver and mercury is, to a large extent, independent of pH, i.e., these metals will bind equally well at low pH and high pH. Specifically, it is now known that most forms of gold, mercury and silver will bind to cell surfaces at a ph of 2 or less, whereas many other metals will fail to bind at significant levels, or will be released if already bound, at this low pH. Thus, based on the observation of that unique and unpredicted interaction of gold, silver, and mercury with cell surfaces at very low pH, it is now possible, by controlling of the pH of the solution containing these metals at a level of about 2 or less, to utilize microorganisms to selectively bind gold, silver and mercury to the substantial exclusion of other metal ions. In the present context, "substantial exclusion" refers to the fact that, in some cases, small amounts of some metal ions such as $Cu^{+2}$ and $Fe^{+3}$ may remain bound to the microbial cells at pH 2; also, certain oxoanions, such as chromate or arsenate may bind to some extent under these conditions. However, regardless of the possible binding of some amount of relatively few other metals, the method is still a very highly selective one for precious metal extraction. In any event, should such competing metals be expected to present a problem, the precious metals may be selectively eluted from the cells without interference from the bound metals. This is discussed in more detail below. Although the metal platinum does not exhibit the pH independent binding observed with gold, silver, and mercury, it coincidentally exhibits its maximum level of binding to cell surfaces at a pH of about 2; it is thus possible to include platinum among the metals which may be selectively extracted at this low pH.

Particularly favored microorganisms for use in the present procedure are unicellular algae, both green and blue-green, which are very simple and inexpensive to grow; organisms of the genus Chlorella are especially amenable to the process because of its exceptional capacity for binding metal ions, especially gold. However, since the ability of a particular metal to bind at a specific pH appears to be a function of the pH-metal interaction rather than a function of the type of cell used, any microorganism capable of binding metals may be used in the present process. Among the preferred organisms are those of the genera Micrasterias, Chlamydomonas, Spirulina and especially Chlorella.

Metal uptake may be tested by suspending a known mass of the microorganism in question in any aqueous solution and adjusting the solution to a pH of 2, by known methods. The metal ion(s) of interest may then be added to an aliquot, and the suspension mixed continuously or at frequent intervals. After allowing a sufficient equilibrium period for metal uptake to occur the reaction mixture is centrifuged to remove microbial cells, the supernatant decanted immediately, and analyzed for the presence of metal ions. In most metal ion removal experiments an equilibrium time of 5-15 minutes is adequate, given an initial ion concentration in the test solution of about $1 \times 10^{-4}$ M.

It is well known that ionic gold may exist in various oxidation states, and, as a waste product or recoverable metal, may also exist as part of a complex, for example, with halides or cyanide. Additionally, it may exist in a completely reduced state, as elemental or colloidal gold. Evidence indicates that all these forms of gold, with the exception of gold-thiourea complexes, are capable of being bound at a pH of 2 or less in the present system, as well as at higher pH. Therefore, as used in the present specification and claims, the term "gold" is intended to include all of the above-mentioned forms.

It will be noted, however, that not all forms of gold bind equally effectively at pH 2. For example, gold-cyanide complexes such as are found in mining dumps do not bind as readily at pH 2 as gold-halide complexes. This may be compensated for by adjusting the concentration of algae used. Alternatively, under circumstances in which additional competing metals are not to be expected in significant amounts, or in which exclusive binding of gold is not required, conditions may be adjusted so as to favor binding of these complexes. These adjustments are based on the observation that although cyanoaurate complexes will bind at pH 2, they do not exhibit the completely pH independent binding characteristics of so many other forms of gold. In fact, the preferred range for binding of cyanoaurate complexes is fairly narrow, between 2 and 4, preferably at pH 3. It is therefore possible, when treating a solution which contains gold-cyanide complexes, to bind them at high levels by adjusting the pH to about 3. As noted above gold thiourea complexes do not behave in the same way as other forms of gold. In fact, gold-thiourea complexes only show significant binding at pH 7 or above, with the preferred pH being at least about 8 or above.

It is also possible by adjusting salt concentration of a pH 2 solution to preferentially favor binding of gold and platinum. Addition of a chloride salt or a complexing agent, to a concentration of at least 0.1M, under the conditions of the present process, will cause the substantial removal of and mercury and to a lesser extent silver, or will significantly diminish their binding, so that primarily only gold and platinum remain adsorbed to the cells. Thus, an effective method of removing mercury selectively is also provided.

As discussed briefly above, it is possible that, in certain circumstances, there may be some binding of a few ions other than the precious metals, and mercury even at a pH of 2. While this may not necessarily be a problem, a method of assuring that only the metals of interest are actually recovered avoids any such difficulties. In connection with the above process, it has been discovered that the metals gold, silver and mercury may be very selectively stripped from microbial cells to which they are bound by treatment of the cells with a sulfur-containing ligand. In fact, by simple variation of the pH, it is possible to elute each one of the metals individually. For example, by dropping the pH to 2, treatment of the cells with the ligand mercaptoethanol will cause mercury to be selectively eluted. Subsequently, by raising the pH to 5, the same treatment will cause gold to be selectively eluted. At a pH of 9, addition of the ligand will strip silver from the cells. Thus, each of the metals may be recovered and isolated separately. It will be readily apparent from the above information that the present selective elution process is useful in isolating gold, silver, and mercury regardless of the pH conditions under which binding occurs, since these metals can bind at nearly any pH value. In other words, although the elution method described is practicable under pH 2 conditions wherein there will often be no other metals bound it may also be utilized under circumstances where a large number of other metals in addition to gold, silver and mercury are also bound to cells. Thus, if the initial contact of cells with a metal-containing solution is conducted under ordinary metal binding conditions, it is still possible to selectively separate gold, silver and mercury by treating the cells with the ligand, and adjusting the pH according to which metal is to be recovered. This then provides an extremely versatile method for selective precious metal recovery. Platinum can also be eluted to some extent by treatment with a ligand such as thiourea. However, unlike the other precious metals, it will not be eluted completely. Therefore, although this elution procedure is operable to some extent, it may be preferable to use some other method (discussed below) in order to remove platinum completely.

The sulfur-containing ligands which are preferred for the elution process are mercaptoethanol, thiourea, or thiosulfate, with mercaptoethanol being particularly preferred. A concentration of ligand of at least about 0.1-0.5M is particularly preferred.

Although the above method is preferred, because of its specificity, there are other methods of eluting the bound precious metals and mercury. For example, addition of high concentrations of bromide or iodide compounds may be successfully used to elute the metals of interest. Mercury may also be selectively eluted by addition of a chloride salt at a concentration of at least about 0.1M. As a final, and certainly less desirable alternative, the cells bearing the metal may be burned, and the remaining metal recovered. In any of the above procedures, except for, obviously, the burning of the cells, the stripped cells may simply be washed and reused.

In the process of determining the most efficient method of elution of bound metals, it was discovered that, in the case of gold, once the gold is bound to the cells, it may be rapidly reduced on the cell surface. Thus, gold which is extracted in the (III) oxidation state may be recovered as gold (I), depending on how long it remains on the cells. The methods of converting gold from one oxidation state to another are well-known, and the requisite techniques will be readily apparent to the skilled artisan, if such conversion should prove necessary or desirable. If bound gold is left without elution for more than 1 day, it is generally completely reduced to gold (0). In the latter case, the gold must be eluted in the presence of an oxidizing agent and a strong ligand, for example, with oxygenated thiourea.

It has also been discovered in connection with the present invention that microorganisms such as Chlorella can also be used to extract various oxoanions such as arsenate, vanadate, chromate, selenate or molybdate, from waste waters in which they occur. For example, the chromate ion, $CrO_4^{2-}$, is a common waste product in various industrial operations, due to the frequent use of electroplating processes. Similarly, molybdate, $MoO_4^{2-}$, is a frequent and undesirable contaminant released during mining and milling operations. Selenate, $SeO_4^{2-}$, is also commonly found in undesirably high concentrations in agricultural waste waters. A simple and inexpensive method for removal of these anions has heretofore not been available. Although attempts have been made to utilize living microorganisms for their extraction, these have met with little or no success. It has now been discovered that the binding of these oxoanions is strongly pH dependent, and is favored at particularly low pH, generally between pH 2 and 4. Specifically, arsenate, selenate and chromate ions (and dichromate ions, with which chromate is in equilibrium) bind strongly at about pH 2, molybdate ions at a pH of about 3, vanadate ions at about pH 4. Part of the earlier problem in developing an efficient mechanism for extracting the ions with microorganisms is that living microorganisms were being used, and further, the pH dependence of binding was not recognized. With the recognition of the importance of controlling the pH of the solution within the specified range, it is therefore possible to easily extract the anions of choice by contacting the adjusted solution with the microbial cells. With the present system, as is explained in more detail below, either dead or living cells may be used; thus the pH intolerance experienced when using live cells is avoidable by using killed cells. In the case of Chlorella and a number of other microorganisms this low pH does not affect the metal binding capabilities of the cells.

As noted above, either living or dead cells may be used in the present process. It is interesting to note, however, that with a number of microorganisms, a higher rate of removal of ions is observed with killed cells, particularly heat-killed cells, as opposed to live cells. Binding of metals may take place by adsorption to the surface, or cell wall, of the microorganism, or by intracellular uptake of metals. Thus, there are a number of different sites for binding. This means that, in addition to using whole cells, cell derivatives or extracts may be used. As utilized herein, in the specification and claims, cell derivatives or extracts refer to, among others, cell wall fragments, or soluble or insoluble macromolecules derived from the cell, which in isolation also possess the ability to bind metal ions. For example, in Chlorella, soluble macromolecules are leached from algal preparations, so that the supernatant remaining after centrifugation of the algal culture retains the ability to bind metals. This material can readily be prepared by simply suspending algae in 0.01M HCl for a few minutes, followed by centrifugation. Complexation with the material frequently results in precipitation of the ion from solution; thus, it is acting as a flocculating agent.

The soluble material may play an important part in the metal ion removal, depending on the metal. Flocculating agents are commonly used in the processes of water treatment and mineral processing (see Kirk-Othmer, Encyclopedia of Chemical Technology, Volume 10 "Flocculation", 1980) and the present system provides an easily-obtained, low-cost flocculant for such use. Thus, it is also contemplated to use such cell derivatives, or parts of cells containing them, rather than whole cells, for bioflocculation in the present process. As noted above, these soluble materials may be readily found in the supernatant of centrifuged cells. Additional soluble molecules may also be obtained following dialysis of cells against distilled water.

There are a number of ways in which the metal binding process may be efficiently employed on a large scale. As noted above, whole cells, either living or dead, may be readily employed. Generally speaking, when dead cells are to be used, they are dried, then resuspended in any aqueous solution and centrifuged again prior to use.

The form in which the cells may be utilized is very varied. For example, the cells may obviously be used in immobilized form in polyacrylamide, a well known technique for immobilization. However, it has been discovered that cells may be used in other forms which are less expensive and/or more effective for the extraction process.

The cells may of course be used alone in a column or filter to accomplish the necessary extraction; however, this is not the most favorable method, since cell clumping and flow problems can easily arise. This problem can be obviated by chemically modifying the cell surface; this can result in the production of a bioadsorbant with increased capacity, and/or improved flow properties, thereby eliminating the need for immobilization. Chemical cross-linking of the cells is one way of achieving this. Results of cross-linking are particularly successful when cyanogen bromide is used as the cross-linking agent followed by treatment with a diamine. This treatment provides a cell mass which not only may be used in column chromatography without immobilization, but also, as in the case of Chlorella, may increase the binding capacity for gold up to twice that of untreated cells.

In addition to the above treated composition, which does not require any immobilization, methods of immobization have been discovered which are far simpler, easier to handle, and generally more inexpensive than known methods. One particularly simple but surprisingly effective combination is that of cells of unicellular green or blue green algae with glass wool. Although glass wool alone is of course known as a filtering device, it has not heretofore been known to be embedded with algae to form an integrated metal-filtering medium. The algae can in fact be grown directly on the glass wool: if glass wool is suspended in a tank in which algae are growing, the algae will adhere to the wool and continue to grow. The resultant glass wool/algae combination can then be plucked from the tank, washed, dried and used in a number of different ways to effect filtration of metal-containing solutions. For example, the algae-impregnated glass wool may be packed into a glass column through which contaminated water may be passed. The flow properties of the glass wool/algae combination are surprisingly good and binding capacity is comparable to that observed with other algal cell embodiments, particularly polyacrylamide-embedded algae. The glass wool/algae combination may also be employed in a contact system in which the glass wool is wrapped around a perforated central delivery pipe and installed in a cartridge type filtration device. The glass wool/algae embodiment is particularly well adapted for use in many known reactors, such as those described in U.S. Pat. Nos. 4,407,954, 4,446,236 and 4,530,763.

The preferred arrangement for the combination is one in which the algae form as high as possible a proportion of dry weight of the total composition. Generally, however, the level at which the algae will embed the glass wool will not go higher than about 60%. The typical proportions of algae present are generally between about 25-60% of the compositions dry weight, preferably at least 40-60%.

A second method of preparing an algae mixture with good filtration capability is by combining algae cells with silica, to form a silica/algae gel. Silica gels are of course frequently used in filtration procedures, but such uses are generally restricted to chromatography in which separation is generally to be by size, rather than by chemical properties; they are not known to be used in connection with waste metal binding, and the combination of silica and algae is an unknown and unexpected one. The matrix required for filtration is prepared as simply as a normal silica gel would be prepared, i.e., with sodium silicate and sulfuric acid. The two gel components are first combined, then dried algae are added, preferably in an amount between 40-90% of the total weight of the composition. Polymerization of the mixture occurs rapidly, and the resulting material is washed and dried. The dried product may then be sieved through mesh screens to produce uniform particle size. The final product is a hard, green material which does not swell, and which in a column gives excellent flow and packing characteristics. It is particularly useful in that it allows the use of very high pressures. It also retains its integrity at extremes of pH, i.e., at least from 1 to about 12.

Both of the above novel compositions provide improvements over the known immobilization techniques in that they are extremely easy to prepare and their cost relative to the cost of more traditional immobilization matrices is quite low Needless to say, neither of these embodiments are restricted to use with any one particular metal, nor at any particular pH. In other words, both the glass wool and the silica compositions are useful in extracting any metal which is capable of binding to algae cells, and is also contemplated for use at any pH at which such binding can occur.

The advantages of the present system are many. At present, most large scale methods of metal recovery utilize expensive ion-exchange resins to bind the metals of interest A typical commercial resin used for metal ion removal (e.g. Dowex chelating resin) can cost up to $100 per pound. On the other hand, most of the microorganisms which are contemplated for use in this invention are cheaply and easily produced in large quantities. For example, the green alga Chlorella can be produced in large quantities, for as little as about $1.00 to $2.00 per pound. Other common algae, bacteria and fungi can also be produced in large quantities at comparable costs. An added benefit of this system is that, in addition to being inexpensive, algae such as Chlorella show a higher affinity for certain metals than chelating ion exchange resins on a dry weight basis.

A further advantage to the use of these microorganisms is that the typical filter may be reused in metal adsorption several times. The effective quantity of microorganisms needed with a microorganism such as Chlorella is as little as 1-5 mg/ml of solution.

As has also been mentioned, a large number of microorganisms have been shown to have the ability to bind a variety of metal ions such as zinc, lead, cadmium, iron, copper, nickel, tin, aluminum, beryllium, magnesium, chromium, cobalt, vanadium, uranium, molybdenum and calcium. With the discovery of the effect of pH on metal binding to algae, it is now possible to provide a simple and effective method of eluting, or reversing the binding of bound metals, by simply reducing the pH of the solution containing the cells to about 2 or less. In fact, a selective elution can be achieved by a progressive reduction of pH since the binding of certain metals has been found to be stronger at higher pH than others (see example 3).

The present invention may be better understood by reference to the following examples, which are for purposes of illustration, and are not intended to limit the scope of the invention:

EXAMPLE 1

Figure 1:
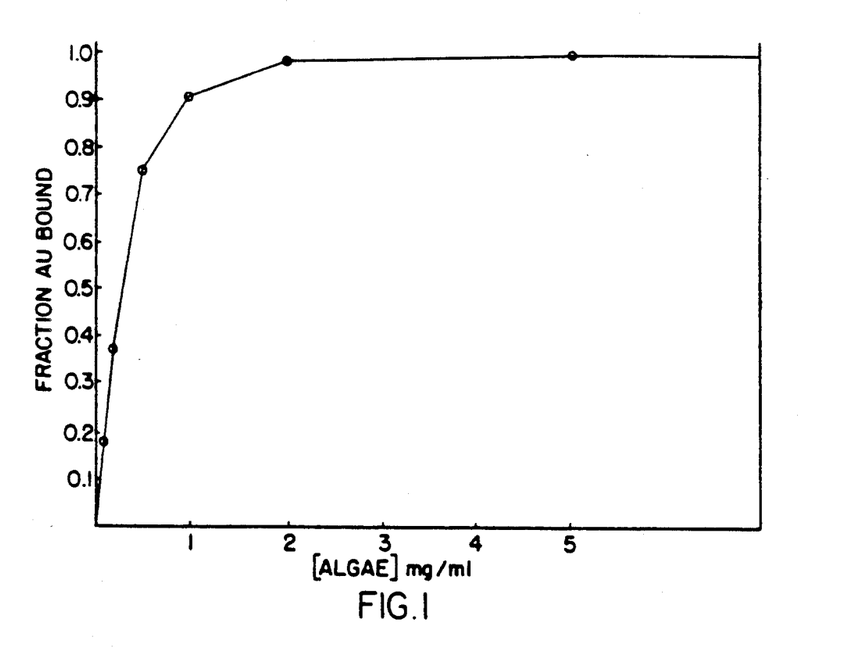
FIG. 1 shows the effect of binding of $Au^{+3}$, as a function of algae concentration, at pH 2.0.
Figure 2:
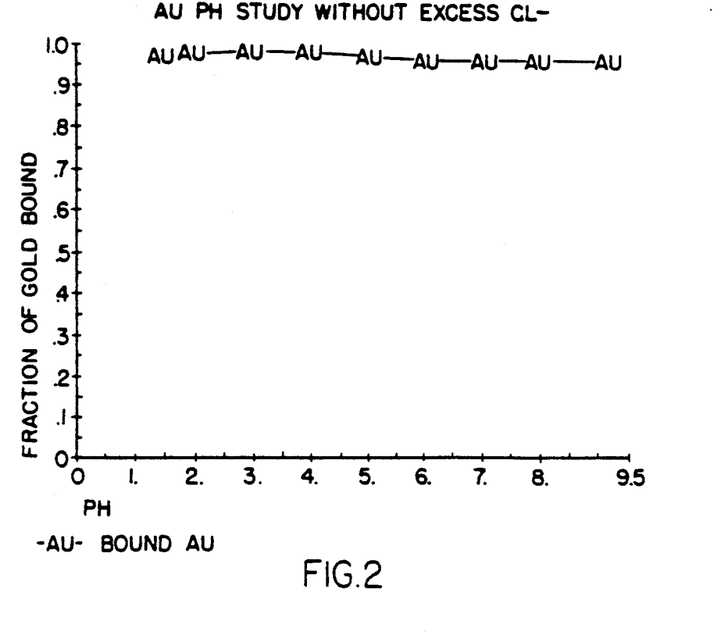
FIG. 2 shows the relative pH-independence of $Au^{+3}$ binding with Chlorella. Concentration of algae is 5 mg/ml.
Figure 3A:
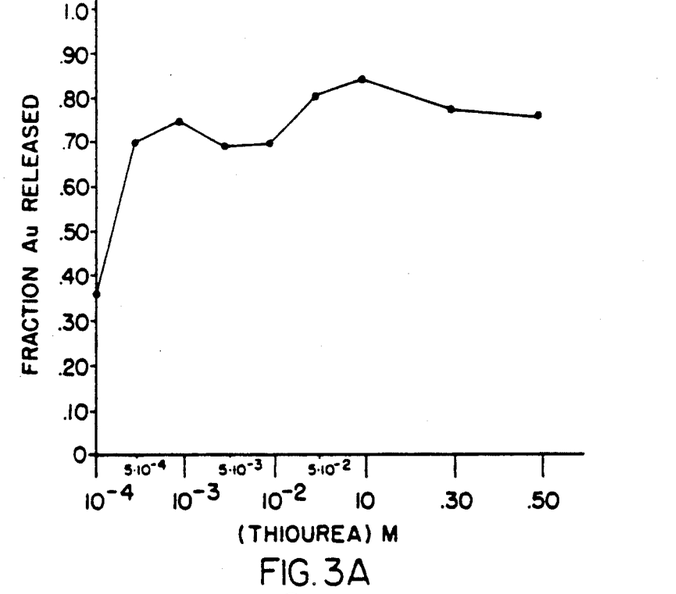
FIG. 3a shows the augmentive effect of thiourea in releasing $Au^{+1}$ bound to cells.
Figure 3B:
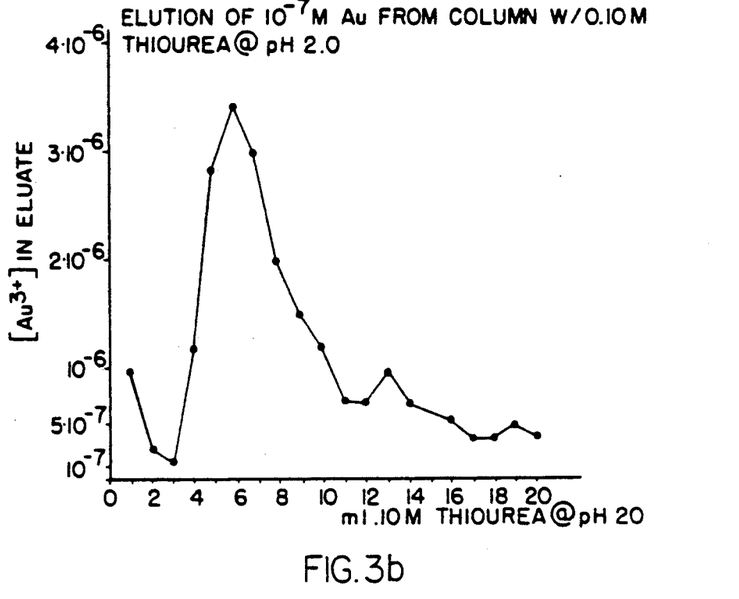
FIG. 3b demonstrates the removal of trace amounts of $Au^{+1}$ with thiourea.
Figure 4:
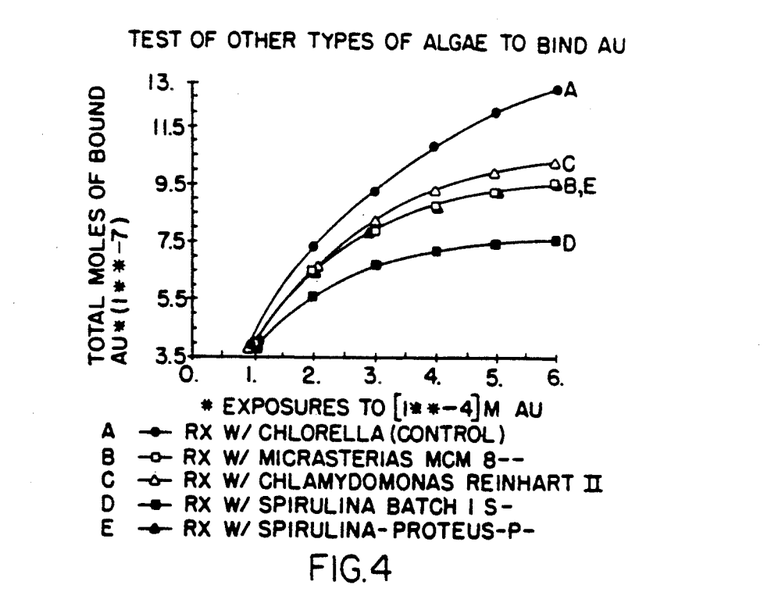
FIG. 4 shows the results of $Au^{+3}$-binding experiments utilizing a number of different types of algae.

1. Binding and elution of $Au^{3+}$ and colloidal gold to/from *Chlorella vulgaris*.

a. Dried *Chlorella vulgaris* was resuspended (at a concentration of 10 mg/ml) in 0.01N HCl or 50 mM HOAc at pH 2.0, then collected by centrifugation. This procedure was performed twice more. The washed algae were then resuspended in a solution of $AuCl_4^-$, typically $1 \times 10^{-4}$ M, at an algae concentration of 1-5 mg/ml. After an incubation period of 15 minutes, the algae were collected. FIG. 1 shows the efficiency of binding as a function of algae concentration at pH 2.0.

b. The binding of $AuCl_4^-$ is relatively insensitive to pH. The experiment depicted in FIG. 2 was performed as described above, employing $1 \times 10^{-4}$M solutions of $AuCl_4^-$ at the indicated pH values. The algae concentration in each case was 5 mg/ml.

c. $Au^{3+}$ or $Au^{+1}$, when bound as described above, was readily eluted by thiourea, as $Au^{+1}$. This is shown in FIG. 3a, which presents the efficiency of elution as a function of thiourea concentration. The elution step was performed by resuspending the gold-containing algae in 0.01M HCl, containing thiourea at the indicated concentrations. After one hour, the algae were centrifuged from solution, and the supernatant was analyzed for gold. Optimal elution was achieved with 0.1M thiourea.

d. $Au^{3+}$ can be removed from solution by Chlorella even when present at trace levels. In the experiment shown in FIG. 3b, 200 ml of a solution containing $1 \times 10^{-7}$M $AuCl_4^-$, in 0.01M HCl, was passed (at a rate of 1 ml/min) through a column containing approximately 120 mg (dry weight) of algae embedded in polyacrylamide. No gold was detected in the eluate. The bound gold was eluted with with 0.1M thiourea in 0.01M HCl. Recovery of bound gold ranges between 75 and 100%.

e. Gold is sequestered by algae other than *Chlorella vulgaris*, as shown in FIG. 4. In this experiment, the washed algae (2 mg/ml) were repeatedly exposed to $1 \times 10^{-4}$M solutions of $AuCl_4^-$ in 0.01M HCl. After each exposure, the algae were removed by centrifugation, and the supernatant was analyzed for remaining $Au^{3+}$. The results are presented in terms of total moles of gold bound after each exposure. Two things should be noted here. The first is that all the varieties bound gold strongly: Nearly complete binding (99.6%) is observed after the first exposure. Secondly, where the different species differ is in their total binding capacities. In this respect, Chlorella outperformed the others tested.

Binding of Colloidal Gold to Chlorella

Figure 5:
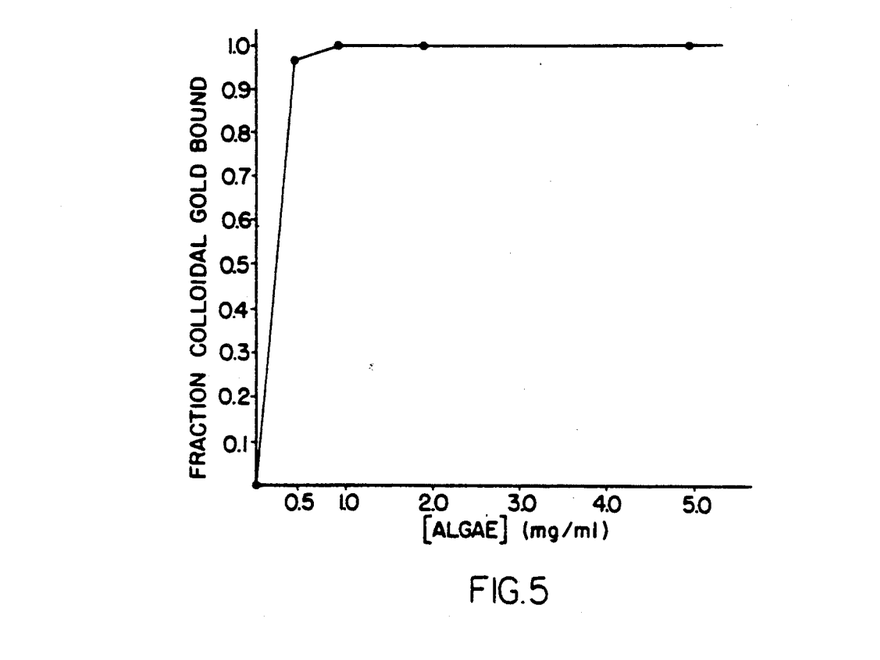
FIG. 5 shows the results of *Chlorella vulgaris*—colloidal gold binding experiments.

Dried *Chlorella vulgaris* were washed three times with 0.01M HCl and then collected by centrifugation. The washed algae were then resuspended in 4.0 ml of a solution of colloidal gold (AuO) which had a concentration of $6.8 \times 10^{-5}$M. The solutions were stirred for two hours and then allowed to stand until the algae settled to the bottom of the container. FIG. 5 shows the efficiency of binding as a function of algae concentration at pH 3.9. The colloidal gold can be eluted from the algae by treatment with thiourea in the presence of oxygen (air).

EXAMPLE 2

Figure 6:
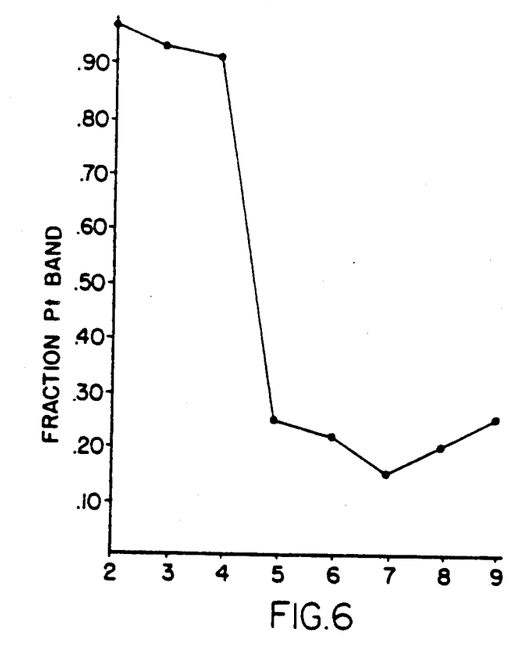
FIG. 6 shows the effects of pH on the binding of platinum to Chlorella.

Binding and Elution of Platinum to/from *Chlorella vulgaris* a. Unlike $Au^{3+}$, the binding of $PtCl_4^{2-}$ is rather strongly pH-dependent. The experiment presented in FIG. 6 was performed in a manner analogous to that described in FIG. 1a for $AuCl_4^-$. Algae (washed at pH 2) were resuspended in $1\times 10^{-4}M$ $PtCl_4^{2-}$ at each of the indicated pH values. Following a two-hour incubation period, the algae were removed by centrifugation, and the supernatant was analyzed for platinum. In contrast to metals other than gold, silver, and mercury, $Pt^{2+}$ is bound more strongly at low pH, preferably at pH 2.

EXAMPLE 3

Figure 7:
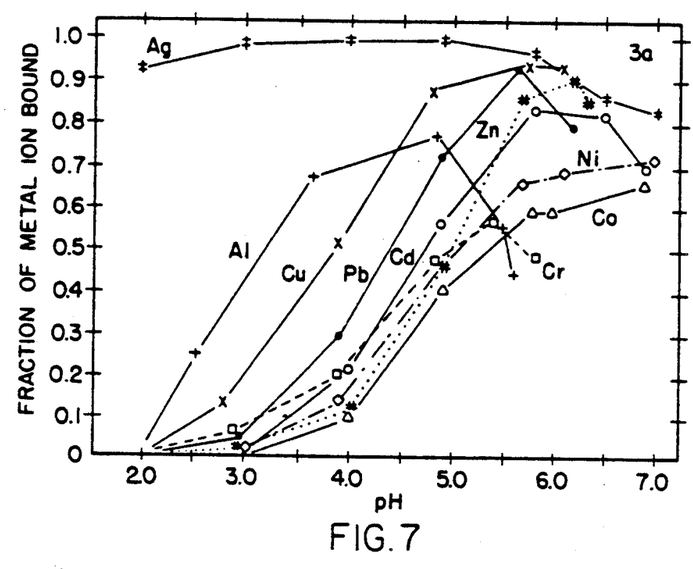
FIG. 7 shows the effects of pH on the binding of various metals to Chlorella.
Figure 8:
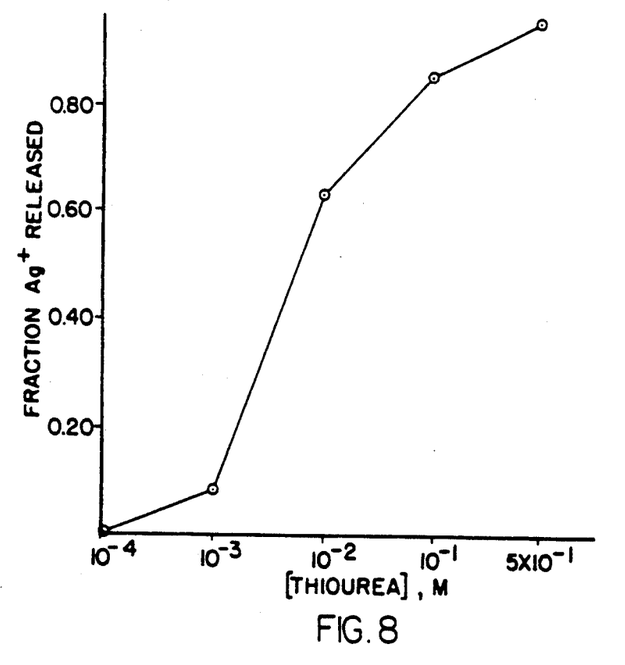
FIG. 8 shows the effects of thiourea on elution of silver bound to Chlorella cells.

Binding of $Ag^+$ to *Chlorella vulgaris* a. Binding of $Ag^+$, like $Au^{3+}$ and $Pt^{2+}$, persists even at pH 2. FIG. 7 displays the pH-dependence of the binding of silver ion, and several other metal ions as well, over the pH range from 2 to 7. Chlorella (at 5 mg/ml) was reacted at the indicated pH values with solutions of each of the various ions shown $(1\times 10^{-4}M)$. After two hours, the mixtures were centrifuged, and the supernatants were analyzed for the appropriate metal ion. Binding of $Ag^+$ is essentially complete between pH 2-6. This figure also shows how different metal ions can be eluted from the algae selectively by proper manipulation of pH. For example, all metal ions are strongly bound to the algae at pHs above 5. If metal ions are bound at pH 5.0 or above and if the pH is then decreased to pH 4.0, most of the $Cr^{+2}$, $Co^{+2}$, $Ni^{+2}$, $Zn^{+2}$, $Cd^{+2}$ and $Pb^{+2}$ will be eluted. By further decreasing the pH to 3.0 most of the $Cu^{+2}$ is eluted (with some $Al^{+3}$), and upon further decrease in pH to 2.0 the remaining aluminum is released. At pH 2.0 (in the absence of $Cl^-$ or other eluting agents), $Ag^+$, $Au^{+3}$, $Pt^{+2}$ and $Hg^{+2}$ are fully bound.

b. Like $Au^{3+}$ and $Pt^{2+}$, bound silver ion can be stripped from *C. vulgaris* by thiourea. This is demonstrated in FIG. 8. Washed algae were suspended in $1\times 10^{-4}M$ $Ag^+$, in 50 mM HOAc at pH 2.0, and allowed to react for 1 hour. Then the algae were collected by centrifugation and resuspended in thiourea at the indicated concentrations. After one hour, the mixture was centrifuged, and the supernatant was analyzed for released silver ion.

EXAMPLE 4

Figure 9:
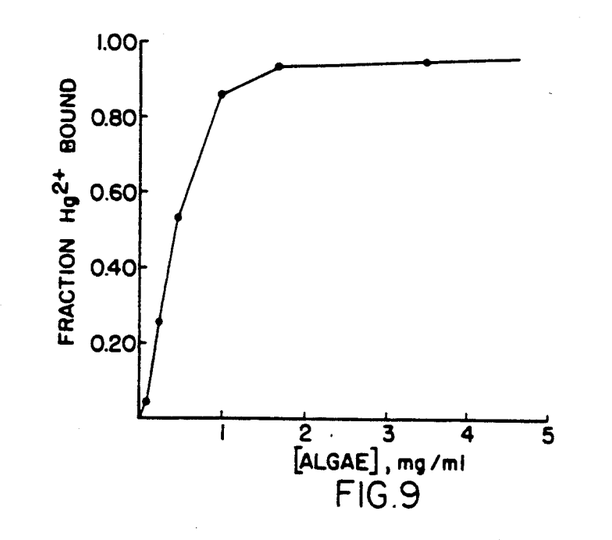
FIG. 9 shows the binding of $Hg^{2+}$ at pH 2 as a function of algae cell concentration.
Figure 10:
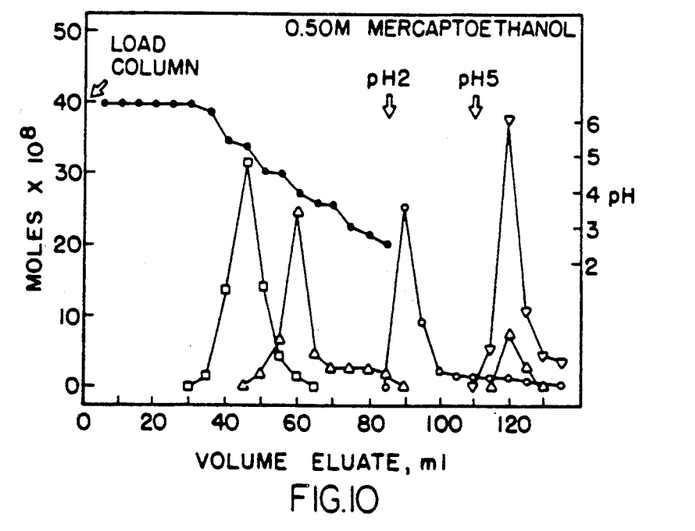
FIG. 10 illustrates the pattern of selective elution of various metal ions with mercaptoethanol.

Binding and Elution of $Hg^{+2}$ to/from *Chlorella vulgaris* a. Like $Au^{+3}$, $Pt^{2+}$ and $Ag^+$, mercuric ion is bound strongly by Chlorella even at pH 2.0. This is illustrated by FIG. 9, which shows the dependence of $Hg^{2+}$ binding as a function of the algae concentration at pH 2.0. Chlorella, at the indicated concentrations was reacted for one hour with $5\times 10^{-4}M$ $Hg^{+2}$ in 50 mM HOAc, pH 2.0. After removing the algae by centrifugation, the supernatants were analyzed. Most of the mercury can be eluted from the algae by treatment with a solution of 0.9M NaCl.

b. Elution of mercury can also be achieved by stripping with mercaptoethanol. The following experiment compares the pattern of elution of various metal ions including gold and mercury:

*C. vulgaris* washed at pH 2.0 was immobilized in a polyacrylamide matrix by suspending the algae in a solution of acrylamide and N,N'-methylenebisacrylamide followed by the addition of small amounts of ammonium persulfate and tetramethylethylenediamine to induce polymerization and crosslinking. The immobilized algae was passed through a 40 mesh sieve, washed over a 100 mesh sieve and then packed into a glass column (5 cm $\times$ 0.7 cm). The column was washed extensively at pH 2 with 0.05M acetic acid and then at pH 6.0 with 0.05M sodium acetate. A solution (5 ml) containing $1.0\times 10^{-4}M$ each of mercury (II) acetate, zinc (II) acetate, copper (II) acetate and sodium tetrachloroaurate (III) was loaded on the column with a flow rate of 0.1 ml/min. After metal ion loading, the column was washed with 0.05M sodium acetate at pH 6 and then the pH was gradually decreased by washing the column with 0.05M sodium acetate at a lower pH. Elution with mercaptoethanol in 0.05M sodium acetate occured at the indicated pH's ($\square$) zinc, ($\triangle$) copper, ($\bigcirc$) mercury, ($\nabla$) gold, ($\bullet$) pH. Results are shown in FIG. 10.

EXAMPLE 5

This example demonstrates the preparation of a glass wool/algae composition for use in filtration.

A sheet of pyrex glass wool was dried in an oven and weighed after drying. The glass wool was then folded in thirds, and placed between two pices of 5" by 5" wire screen, which was held in place at the corners by copper wire.

The glass wool-wire screen assembly was then suspended in a tank of growing algae for approximately 48 hours. A submersible pump provided circulation in this tank. The assembly was then removed, and washed once with 0.1M NaCl, and once with distilled water. After washing, the glass wool was removed from the screen and freeze dried. The resulting material consisted of 51% algae by dry weight of total composition. Alternatively, impregnated glass wool may be dried in a stream of warm air.

The algae-glass wool was packed into a glass tube, and a copper-bearing solution was passed through the column. Copper was bound to the algae cells, and then recovered from the column using a pH 2 stripping solution. The binding capacity is comparable to that observed with algae immobilized in polyacrylamide as well as native algae.

EXAMPLE 6

This example shows the process of preparation of the silica-algae composition.

The following solutions were first prepared:
a. 2M $H_2SO_4$
b. a solution of $Na_2SiO_3\cdot 9H_2O$ having a density of 1.14 g/ml (equivalent to about 30% $Na_2SiO_3\cdot 9H_2O$ in distilled water, 1.06M.

I. To make a preparation of 44% algae approximately 15 mls $Na_2SiO_3\cdot 9H_2O$ solution was added dropwise with rapid stirring to approximately 10 mls 2 M $H_2SO_4$. Addition continued until the pH reached 5.0. 1.0 gram of dry algae was then added and mixed thoroughly. After a period of about 10 minutes, polymerization of the mixture occurred. It was allowed to harden for approximately one hour. The product was then broken up into smaller pieces and washed repeatedly until the concentration of sulfate was undetectable. The washed gel was dried overnight at 110° C.

II. To prepare an 88% algae composition 10 mls of $Na_2SiO_3 \cdot 9H_2O$ was added dropwise to a 10 mls of 2M solution of $H_2SO_4$ until the pH reached 3.6. 4.6 g of dry algae was added to the mixture until the polymerization process occurred spontaneously.

Addition of this dry algae raised the pH and induced polymerization. The resulting material was washed and dried as described in I above.

In both cases, the dried material was sieved through 40 and 100 mesh screens to produce uniformly-sized particles. The final product is a hard, green, granular substance.

Figure 15:
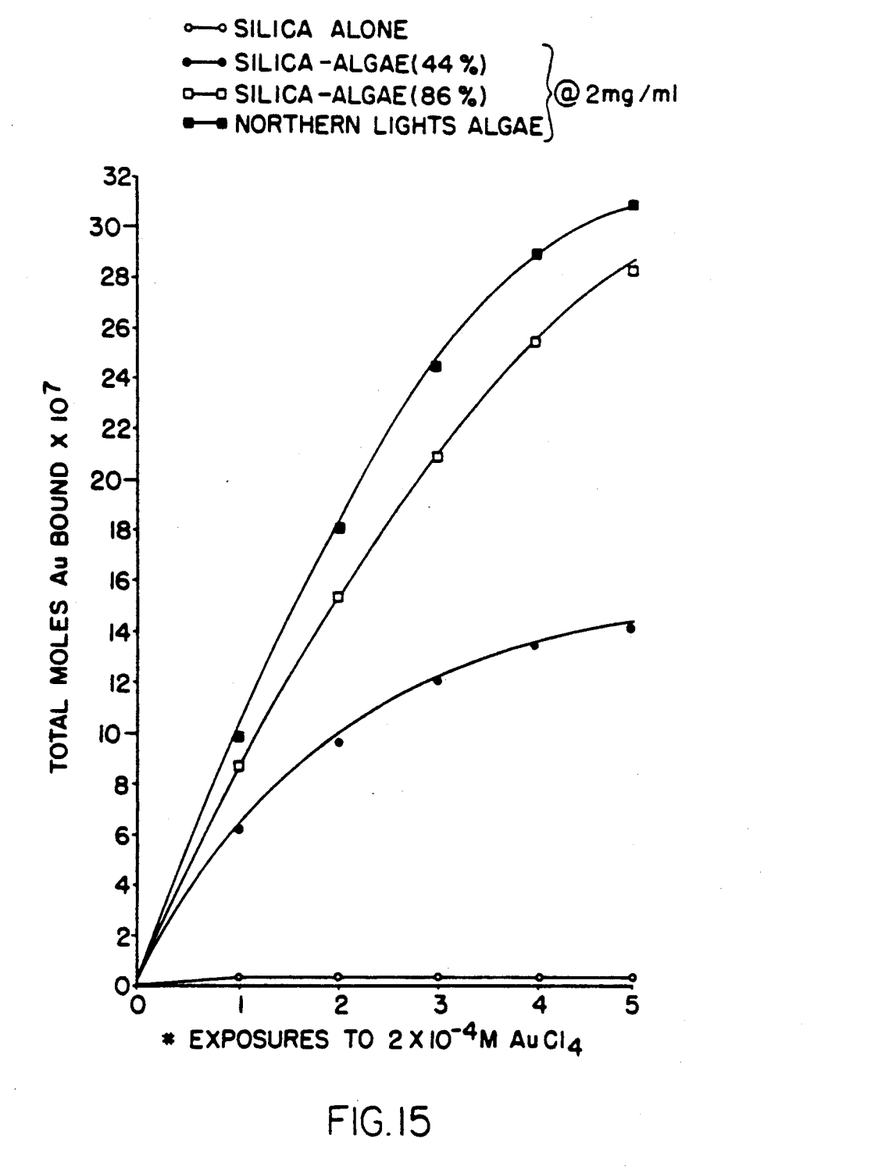
FIG. 15 demonstrates the pattern of gold binding to an algae/silica gel composition.

The two products were tested for their capacity to bind $Au^{3+}$. The material was tested in batch procedure at concentrations of 2 mg/ml. The silica-algae compositions were compared with silica gel alone and native algae alone. The testing procedure involved 5 exposures of $2 \times 10^{-4}M$ $AuCl_4$ in 0.01M HCl for 30 minutes at each exposure; the results of the testing are shown in FIG. 15.

EXAMPLE 7

The following Example demonstrates the binding of the oxoanions molybdate and vanadate by Chlorella.

Figure 12:
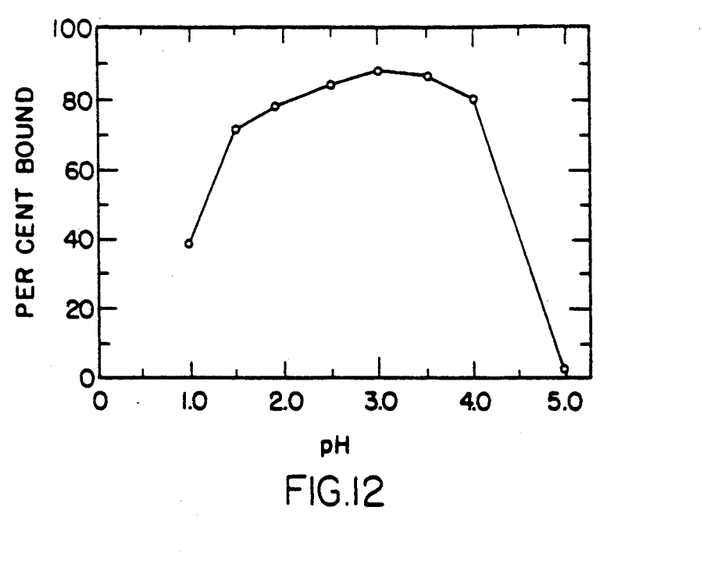
FIG. 12 shows the pH dependent pattern of binding of molybdate ion.

Dried *C. vulgaris* was washed, then resuspended at a concentration of 5 mg/ml in $5 \times 10^{-4}M$ solutions of $Na_2MoO_4$ at pH values of 1-5. After a one hour equilibration period, the reaction mixtures were centrifuged, and supernatants were analyzed for free molybdate. The data were calculated as percent $MoO_4^{2-}$ bound as a function of pH. The maximum binding is at pH 3, as shown in FIG. 12. Similar tests were run with a $1.0 \times 10^{-4}M$ sodium vanadate solution, and results similarly calculated vanadate ion binds over a very narrow range of pH, with a maximum at pH 4, as shown in FIG. 12.

EXAMPLE 8

This example describes the pattern of binding of chromate ions by Chlorella.

Figure 11:
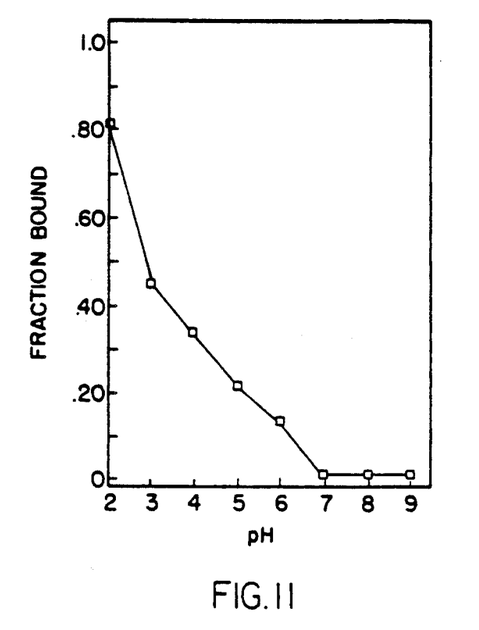
FIG. 11 shows the pH dependent pattern of binding of chromate ion.
Figure 13:
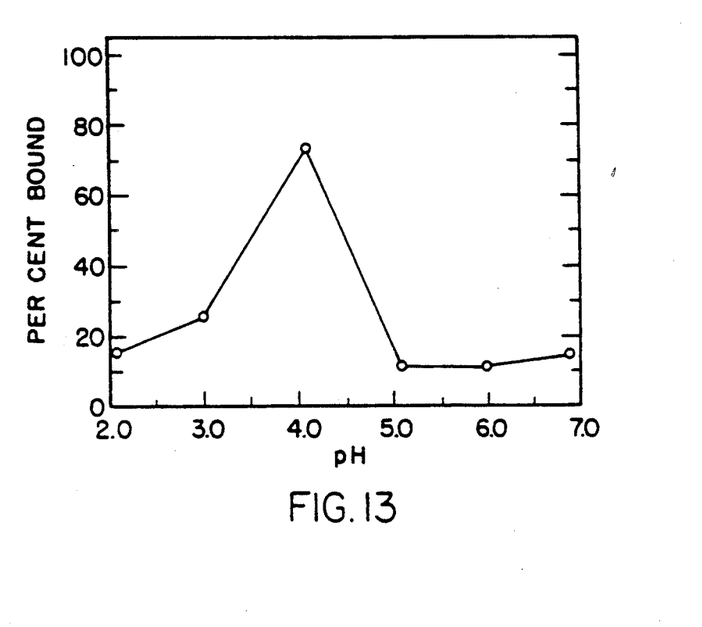
FIG. 13 shows the pH dependent pattern of binding of vanadate ion.

20 mg portions of algae were washed three times with 0.01M $HNO_3$ in separate tubes. Each portion was resuspended in $1 \times 10^{-4}M$ $NaCrO_4$ which had been adjusted to one of the pH values included in FIG. 13. After one hour at room temperature, the reaction tubes were centrifuged and the supernatants were analyzed for residual $CrO_4^{2-}$, employing standard chromate solutions that had been adjusted to the corresponding pH values. The data in FIG. 11 are presented as fraction of chromate bound vs pH.

EXAMPLE 9

This example describes a procedure for crosslinking Chlorella cells with cyanogen bromide.

0.5 g of washed algae was resuspended in 5 ml of 2 M $Na_2CO_3$ and chilled to 0°-4° C. in an ice bath. 1.0 g CNBr, dissolved in 0.5 ml acetonitrile was then added with stirring. After five minutes, the algae were collected, and washed one time with ice cold $H_2O$, and then resuspended in 2 ml of 50% (v/v) 1,6-diaminohexane in 0.2M $NaHCO_3$, pH 9.5 and chilled once more to about 0° C. After 30 minutes, with continuous agitation, the algae were collected washed one time with $H_2O$ and resuspended in 5 ml of 2M $Na_2CO_3$. 1.0 g of CNBr, in 0.5 ml of acetonitrile, was added with stirring. After 15 minutes at 0° C., the algae were collected and washed four times with 5 ml d.d. $H_2O$. The resulting material, after being sieved on a 250 mesh screen, was then employed in column chromatography without difficulty.

On exposure to $9.0 \times 10^{-5}M$ $AuCl_4^{1-}$ at pH 2, the cross-linked Chlorella proved to have an $Au^{3+}$ binding capacity nearly twice as great as that of the unmodified control (0.38 mmole/g vs. 0.20 mmole/g).

EXAMPLE 10

This example illustrates the removal of gold from cyanide containing solutions.

I. Lyophilized cells of *Chlorella vulgaris* were washed three times in 0.01M NaCl. 20 mg portions were then dispensed into separate tubes. The algae in each tube were resuspended in 4.0 ml of $1.0 \times 10^{-5}M$ [Au$(CN)_2]^{-1}$, and the pH of each tube was adjusted with $HNO_3$ to one of the values indicated in FIG. 14. After a one hour contact time, the algae were removed and the supernatant was analyzed for free gold ion.

Figure 14:
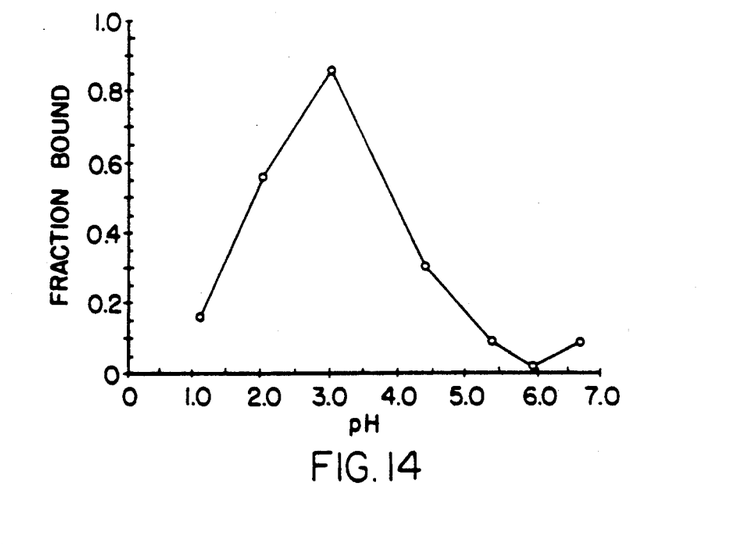
FIG. 14 illustrates this pH dependent pattern of binding of $[Au(CN)_2]^{-1}$.

The results shown in FIG. 14 indicate that significant binding occurs at a pH of 2-4, with maximum binding occurring at about pH 3.

II. Behavior of gold ions in a cyanide solution was also compared with that of silver and copper.

A waste solution, obtained from a jewelry manufacturer, contained $2.2 \times 10^{-4}M$ silver, $3.04 \times 10^{-3}M$ copper, and $5.4 \times 10^{-3}M$ gold. All metals were cyano complexes, and the pH of the solution was 10.2. The following procedure was performed on a 1/10 dilution, with water, at pH 10.2.

Figure 14A:
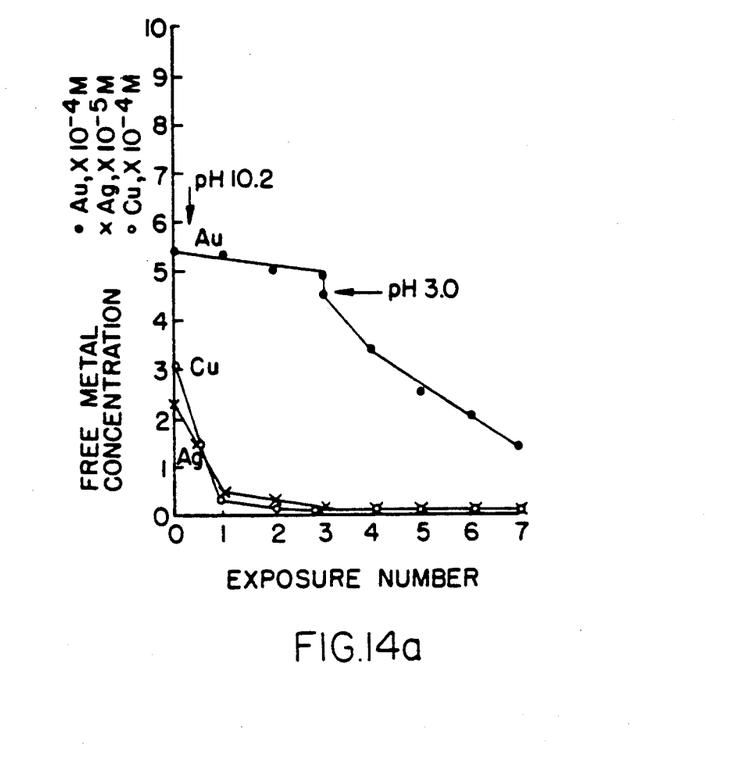
FIG. 14a compares the binding of silver, gold and copper in cyanide containing solutions.

A volume of the solution was shaken with algae at 10 mg/ml for 15 minutes, centrifuged, and the supernatant transferred to a fresh portion of algae. Shaking for 15 minutes, at 10 mg/ml with fresh algae was repeated 2 times more. FIG. 14a shows the free concentration of copper, silver, and gold in the supernatants after the three exposures. Results show that silver and copper were nearly completely bound after the first exposure, whereas only a small amount of gold was removed.

After the 3rd exposure, the pH of the solution was lowered to 3.0 by addition of nitric acid. A slight precipitate formed and was removed by centrifugation; this contained about 7% of the gold. The solution, now containing $4.5 \times 10^{-4}M$ gold was then exposed, for 15 minute periods with shaking, to fresh algae at 10 mg/ml at pH 3.0. Each exposure resulted in significant removal of gold from solution.

What is claimed is:

1. A composition useful in extraction of metal ions and oxoanions from aqueous solutions consisting essentially of a silica gel polymerized in combination with a metal- or oxoanion-binding effective amount of cells of a unicellular green or blue green alga.

2. The composition of claim 1 wherein the amount of cells is about 40-90% of the total weight of the composition.

3. The composition of claim 2 wherein the amount of cells is about 80-90% of the total weight of the composition.

4. The composition of claim 1 wherein the alga is Chlorella.

* * * * *